United States Patent
Mecklin

(10) Patent No.: US 7,725,581 B1
(45) Date of Patent: May 25, 2010

(54) PRIORITIZING ACTIONS AT A MEDIA GATEWAY CONTROLLER AND A MEDIA GATEWAY

(75) Inventor: Tomas Mecklin, Ebso (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2172 days.

(21) Appl. No.: 10/110,481

(22) PCT Filed: Sep. 25, 2000

(86) PCT No.: PCT/EP00/09464

§ 371 (c)(1),
(2), (4) Date: Apr. 30, 2002

(87) PCT Pub. No.: WO01/28257

PCT Pub. Date: Apr. 19, 2001

(30) Foreign Application Priority Data

Oct. 12, 1999 (GB) ................................. 9923982.4

(51) Int. Cl.
*G06F 13/00* (2006.01)
(52) U.S. Cl. .................. 709/226; 709/229; 709/249; 709/250; 709/223; 709/224; 709/238; 709/207; 370/401
(58) Field of Classification Search .............. 709/226, 709/229, 249–250, 223–224, 238, 207; 370/401
See application file for complete search history.

(56) References Cited

U.S. PATENT DOCUMENTS

| | | | |
|---|---|---|---|
| 6,324,279 B1 * | 11/2001 | Kalmanek et al. ............ | 379/229 |
| 6,377,799 B1 * | 4/2002 | Hameleers et al. ........ | 455/422.1 |
| 6,434,140 B1 * | 8/2002 | Barany et al. ................ | 370/352 |
| 6,614,781 B1 * | 9/2003 | Elliott et al. ................. | 370/352 |
| 6,744,768 B2 * | 6/2004 | Vikberg et al. .......... | 370/395.21 |
| 6,778,494 B1 * | 8/2004 | Mauger ....................... | 370/230 |
| 6,829,232 B1 * | 12/2004 | Takeda et al. ............... | 370/352 |
| 6,907,462 B1 * | 6/2005 | Li et al. ....................... | 709/226 |
| 2003/0202521 A1 * | 10/2003 | Havinis et al. .............. | 370/401 |

FOREIGN PATENT DOCUMENTS

WO 99/01991 1/1999

OTHER PUBLICATIONS

Media Gateway Control Protocol, Internet draft, Version 0.1, Internet Engineering Task Force, Feb. 21, 1999.*
Anquetil et al.; "Media Gateway control Protocol and Voice Over IP Gateways, MGCP and VoIP gateways will offer seamless interworking of new VoIP networks with today's telephone networks;" Electrical Communication, Alcatel; Brussels, BE; Apr. 1, 1999; pp. 151-157.

(Continued)

*Primary Examiner*—Alina N. Boutah
(74) *Attorney, Agent, or Firm*—Nixon & Vanderhye P.C.

(57) ABSTRACT

A method of prioritizing actions at a gateway (1) to a bearer network (3), the gateway comprising a Media Gateway (7) which is responsible for establishing call connections over said bearer network (3) and a Media Gateway Controller (4) coupled to the Media Gateway. A signalling message is received at the Media Gateway Controller (4), which determines the priority of the message. The signalling message is converted into a Media Gateway Control Protocol (MGCP) message including a parameter indicating the priority of the associated signalling message. The MGCP is then transferred to the Media Gateway (7) which acts upon the message in accordance with the indicated priority.

11 Claims, 3 Drawing Sheets

OTHER PUBLICATIONS

Steinar Dahlin and Erik Örnulf; "Network evolution the Ericsson way;" Ericsson Review No. 4, 1999; pp. 174-181.

International Search Report mailed Mar. 8, 2001 in corresponding PCT Application PCT/EP00/09464.

* cited by examiner

PRIORITIZING ACTIONS AT A MEDIA GATEWAY CONTROLLER AND A MEDIA GATEWAY

This is the U.S. national stage application of PCT international application number PCT/EP00/09464, filed on Sep. 25, 2000, which claims priority from GB 9923982.4 filed on Oct. 12, 1999.

FIELD OF THE INVENTION

The present invention relates to Media Gateway Control and in particular to the gateway control protocol which defines communications between a Media Gateway Controller and a Media Gateway of a communications system.

BACKGROUND TO THE INVENTION

Telecommunications networks currently rely to a large extent upon the Signalling System no. 7 (SS7) as the mechanism for controlling call connections and for handling the transfer of signalling information between signalling points of the networks. Typically, one or more application and user parts at a given signalling point will make use of SS7 to communicate with peer application and user parts at some other signalling point. Examples of user parts are ISUP (ISDN User Part) and TUP (Telephony User Part) whilst examples of application parts are INAP (Intelligent Network Application Part) and MAP (Mobile Application Part). The conventional SS7 protocol stack includes Message Transfer Parts MTP1, MTP2, and MTP3 which handle the formatting of signalling messages for transport over the physical layer, error correction and detection, as well as various routing functions.

SS7 typically uses the same physical transport layer as is used for transporting actual user information, e.g. voice and facsimile information. In Europe, the conventional physical transport mechanism is a time division multiplexed Synchronous Transport Mechanism (STM) known as E.1. In the US, a similar transport mechanism known as T.1 is used.

There has been considerable interest of late amongst the telecommunications community in using non-standard (i.e. non-conventional within the telecommunications industry) "bearer" transport mechanisms in telecommunications networks to carry user data, for example, voice traffic. The reasons for this are related both to improvements in efficiency as well as potential cost savings. Much consideration has been given for example to the use of Internet Protocol (IP) networks to transport user information between network nodes. IP networks have the advantage that they make efficient use of transmission resources by using packet switching and are relatively low in cost due to the widespread use of the technology (as opposed to specialised telecommunication technology). There is also interest in using other transport mechanisms such as ATM.

The standard ISUP which deals with the setting-up and control of call connections in a telecommunications network is closely linked to the standard bearer transport mechanism and does not readily lend itself to use with other non-standard transport technologies such as IP and ATM. As such, several standardisation bodies including the ITU-T, ETSI, and ANSI, are currently considering the specification of a protocol for the control of calls, which is independent of the underlying transport mechanism. This can be viewed as separating out from the protocol, Bearer Control functions which relate merely to establishing the parameters (including the start and end points) of the "pipe" via which user plane data is transported between nodes, and which are specific to the bearer transport mechanism. The new protocol, referred to as Bearer Independent Call Control (BICC), retains Call Control functions such as the services invoked for a call between given calling and called parties (e.g. call forwarding), and the overall routing of user plane data. FIG. 1a illustrates the conventional integrated Call Control and Bearer Control structure of ISUP whilst FIG. 1b illustrates the proposed new separated structure. In place of BICC, alternative protocols such as SIP may be used.

It is noted that at the junctions between different bearer networks, i.e. between different transport media, a gateway is present which requires both the CC functions and BC functions. The splitting of the CC and BC control derives in part from the Gateway Decomposition work which was carried out by the IETF SS7IP, SIGTRAN and MEGACO working groups, ETSI Tiphon Project, ITU SG16 Study Group 16, ATM Forum and Multiswitching Service Forum (MSF) on establishing an architecture and requirements for decomposed gateways.

As a result of the CC/BC split, a new interface is exposed between the CC functions and BC functions. A Gateway Control Protocol is required to enable coupling between the CC functions and BC functions when a node is implemented in a separated environment. The term for this standardised interface protocol is the 'Media Gateway Control Protocol' (MGCP). This protocol is being developed by the ITU Study Group 16 (H.GCP) and in the IETF MEGACO (MGCP) working group. In ITU Study Group 16 and IETF MEGACO, the CC function is know as 'Media Gateway Controller (MGC)' and the BC function is known as 'Media Gateway (MG)'. The need for the MGCP is illustrated in FIG. 2, which illustrates two peer gateway nodes which communicate with one another at both the CC level and the BC level. It will be appreciated that the definition of a MGCP will allow a Media Gateway Controller to be used with any type of Media Controller (and vice versa) as long as both utilise the MGCP.

SUMMARY OF THE PRESENT INVENTION

In the United States' ISUP based networks, provision is made for prioritising actions at network nodes such as switches. At present there are three priority levels. Prioritising allows for example emergency (i.e. 911) calls to be connected ahead of other "normal" calls, even though set-up messages for those other calls were received prior to the set-up message associated with the emergency call. In the Japanese ISUP based networks, provision has been made for six levels of priority.

As already noted, the new BICC protocol is being specified to enable it to carry substantially all of the information which is currently carried by the various variations of ISUP. In particular, it will provide for the prioritisation of messages (and call connections) such as the Initial Address Message (IAM) which is used to set-up a call connection. Thus, it will be possible to convey priority information transparently across an IP or ATM network. However, as yet there is no mechanism for actually using priority information received at a gateway node to prioritise actions taken by the Media Gateway.

It is an object of the present invention to overcome or at least mitigate the disadvantages noted in the preceding paragraph. This and other objects are achieved at least in part by including in Gateway Control Protocol messages a parameter which indicates the priority of the message.

According to a first aspect of the present invention there is provided a method of prioritising actions and/or connections at a gateway to a bearer network, the gateway comprising a Media Gateway which is responsible for establishing call connections over said bearer network and a Media Gateway Controller coupled to the Media Gateway, the method comprising the steps of:

receiving a signalling message at a Media Gateway Controller;
   determining the priority of the message at the Media Gateway Controller;
   converting the signalling message into a Gateway Control Protocol (GCP) message;
   including in the GCP message a parameter indicating the priority of the associated signalling message; and
   transferring the GCP message to the Media Gateway and acting upon the message in accordance with the indicated priority.

Preferably, the method comprises exchanging signalling messages between the Media Gateway Controller and a controller in the same or another network domain. The messages are exchanged in the former case using the Bearer Independent Call Control (BICC) protocol and in the latter case using ISUP.

In one embodiment of the present invention, the signalling message received at the Media Gateway Controller is a Call Control Set-up message associated with the setting-up of a call connection, e.g. an Initial Address Message (IAM) in ISUP and BICC. The priority of the message may depend upon for example a B-number contained in the message or upon the type of connection to which the message relates. The priority of the message determines whether or not a connection should be set up by the Media Controller across the bearer network ahead of connections associated with Call Control Set-up messages previously received by the Media Gateway Controller.

According to a second aspect of the present invention there is provided a Media Gateway Controller arranged in use to control a Media Gateway which is responsible for establishing call connections over a bearer network, the Media Gateway Controller comprising:

an input for receiving a signalling message;
   first processing means for determining the priority of the message; and
   second processing means for converting the signalling message into a Gateway Control Protocol (GCP) message and for including in the GCP message a parameter indicating the priority of the associated signalling message or connection; and
   transfer means for transferring the GCP message to the Media Gateway.

According to a third aspect of the present invention there is provided a Media Gateway arranged in use to establish call connections over a bearer network, the Media Gateway comprising;

an input for receiving a Gateway Control Protocol (GCP) message from a Media Gateway Controller;
   first processing means for identifying the priority level of the message from a priority parameter contained in the GCP message; and
   second processing means for acting on the GCP message in accordance with the priority level.

DETAILED DESCRIPTION OF CERTAIN EMBODIMENTS

Figure 1A:
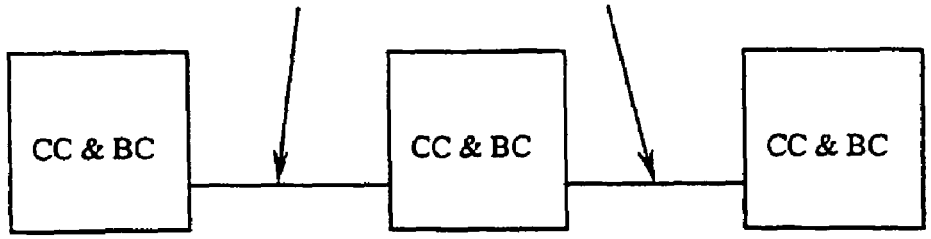
FIG. 1a shows in block diagram form the architecture of a conventional telecommunications network.
Figure 1B:
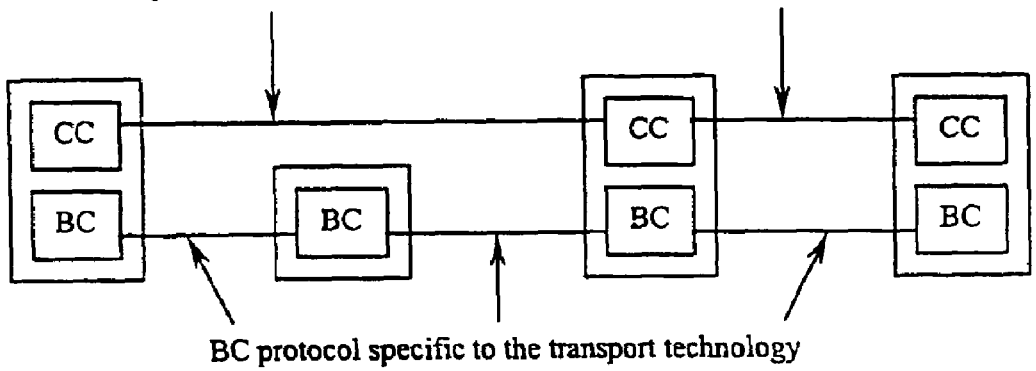
FIG. 1b shows in block diagram form a network architecture in which the Call Control protocol is independent of the transport mechanism.
Figure 2:
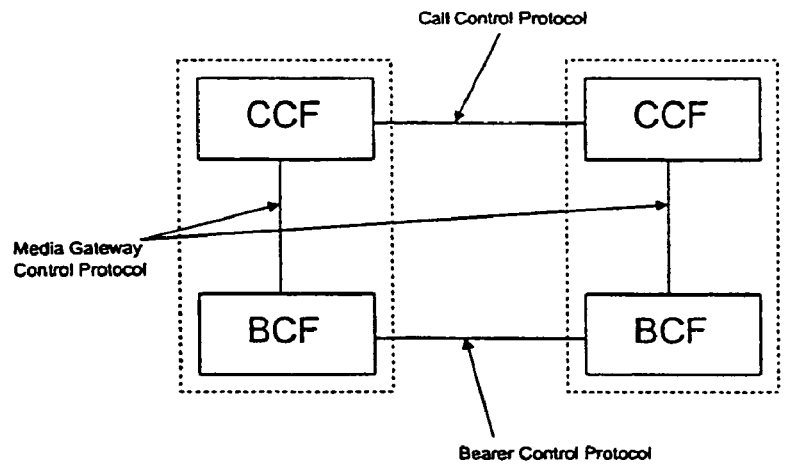
FIG. 2 illustrates the protocol layers at two peer gateway nodes which communicate with one another at both the CC level and the BC level.

The proposed separation of the Call Control (CC) protocol and the Bearer Control (BC) protocol in future telecommunications standards, such as the Universal Mobile Telecommunications Standard (UMTS), has been described above with reference to FIGS. 1a, 1b, and 2.

Figure 3:
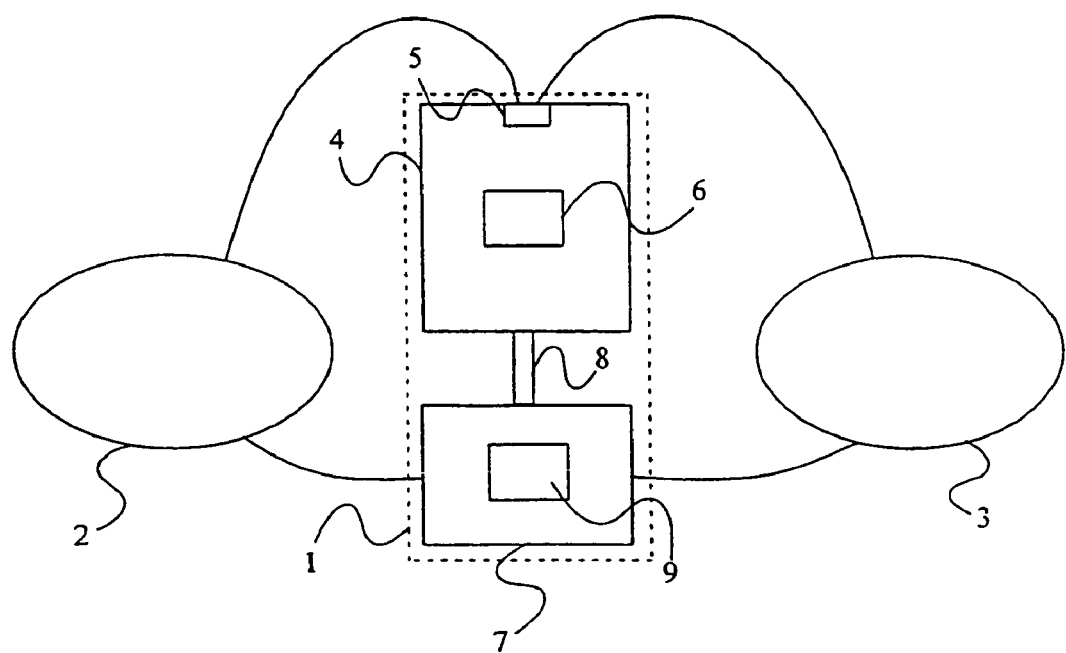
FIG. 3 illustrates in block diagram form a gateway comprising a Media Gateway and a Media Gateway Controller.

FIG. 3 illustrates a gateway 1 which interconnects two communications networks 2,3. These networks may both make use of the BICC protocol to set-up and control connections across respective bearer networks. Alternatively, one of the networks 2,3 may be a conventional telecommunications network making use of ISUP to set-up and control connections across an E.1/T.1 STM physical network. In the latter case, the gateway 1 comprises a translation function which translates signalling messages between BICC and ISUP. However, for the purpose of the following example, it will be assumed that both of the communications networks 2,3 are BICC networks.

The gateway 1 comprises a Media Gateway Controller 4 which operates at the call control level, and which exchanges signalling information with peer Media Gateways within the network 2,3. As already noted, signalling information is exchanged using the BICC protocol. The Media Gateway Controller 4 comprises an input/output 5 for receiving and sending BICC signalling messages and processing means 6 for processing the BICC messages.

As has already been outlined above, a Media Gateway Control Protocol (MGCP) has been defined to allow the Media Gateway Controller 4 to communicate over a standardised interface with a Media Gateway (identified by reference numeral 7 in FIG. 3). The Media Gateway 7 operates at the bearer control plane, in particular to establish call connections over the networks 2,3. As illustrated in FIG. 3, a bi-directional bus 8 connects the Media Gateway 7 to the Media Gateway Controller 4, the bus carrying MGCP messages. The Media Gateway 7 comprises processing means 9 for processing received MGCP messages and for establishing and controlling call connections in response to the received messages. Where the networks 2,3 are IP networks, the Media Gateway 7 acts essentially as an IP router, receiving and sending IP datagrams.

Consider the situation where the Media Gateway Controller 4 receives a BICC Initial Address Message (IAM) from a peer node of one of the networks 2. This message is normally associated with the setting up of a call connection between a calling party (A-subscriber) and a called party (B-subscriber) and is passed from the local exchange of the A-subscriber to the local exchange of the B-subscriber (via any intermediate switches). The Media Gateway Controller 4 analyses the BICC IAM (using the processing means 5) to determine what action must be taken by the Media Gateway 7. In particular, the Media Gateway Controller 4 will issue a call set-up MGCP message to the Media Gateway 7. This message will include the identity of the port number and IP address (in the network 3) to which the Media Gateway 7 must establish a connection, together with the identity of the IP address of the peer node (in the network 2) from which the connection was initiated.

BICC messages may have associated with them one of a number of priority levels. In order to convey this priority to the Media Gateway, some modification to the MGCP, and to the Media Gateway Controller 4 and the Media Gateway 7, is required. The Media Gateway Controller 4 determines from the appropriate field of the BICC IAM, the priority of the associated call. Alternatively, the priority of the message may be determined from the B-number. For example, if the B-number corresponds to an emergency number then the message may be given a high priority. The priority may be one of two or more predefined priority levels. The MGCP message contains a priority field, and the priority of the BICC IAM message is mapped by the Media Gateway Controller 4 into that MGCP message field such that on receipt of the MGCP message the Media Gateway 7 is able to determine the priority of the message.

Figure 4:
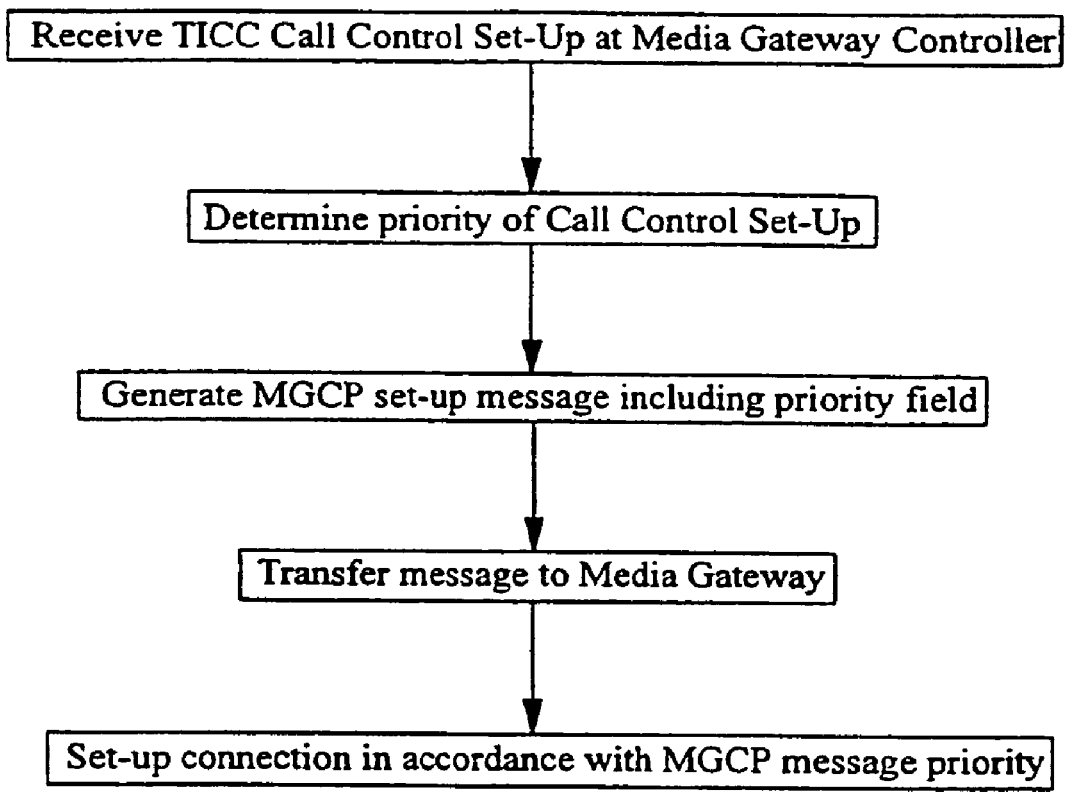
FIG. 4 is a flow diagram illustrating a method of operation of the gateway of FIG. 3.

The Media Gateway 7 acts on the message in dependence upon the determined priority. For example, the Media Gateway 7 may have a cue of connections awaiting set-up across the bearer network 3. Each connection has associated with it a priority level. In the event that a MGCP set-up message is received by the Media Controller, and that message has a high priority associated with it, the connection is set up over the bearer network 3 in advance of connections already queuing but which have a lower priority associated with them. An MGCP message which is received by the Media Controller and which has a low priority associated with it is placed at the back of the connection queue FIG. 4 is a flow diagram which further illustrates the connection set-up process described above.

It will be appreciated by the person of skill in the art that various modifications may be made to the above described embodiment without departing from the scope of the present invention. For example, the above discussion has been concerned primarily with MGCP connection set-up messages. However, it will be appreciated that a priority may also be associated with other MGCP messages.

The invention claimed is:

1. A method of prioritizing actions and/or connections at a gateway associated with a bearer network, the gateway comprising a Media Gateway which is responsible for establishing call connections over said bearer network and a Media Gateway Controller coupled to the Media Gateway, the method comprising the steps of:

receiving a signalling message at the Media Gateway Controller;

determining the priority of the message at the Media Gateway Controller;

converting the signalling message into a Gateway Control Protocol (GCP) message;

including in the GCP message a parameter indicating the priority of the associated signalling message; and transferring the GCP message to the Media Gateway and acting upon the message in accordance with the indicated priority.

2. A method according to claim 1, comprising exchanging call control messages between the Media Gateway Controller and a controller in a same or another network domain using a Bearer Independent Call Control (BICC) protocol or ISUP, respectively.

3. A method according to claim 2, wherein the signalling message received at the Media Gateway Controller is a Call Control Set-up message associated with the setting-up of a call connection, and the priority of the message determines whether a connection should be set up by the Media Controller across a bearer network ahead of a connection associated with a Call Control Set-up message previously received by the Media Gateway Controller.

4. A Media Gateway Controller arranged in use to control a Media Gateway which is responsible for establishing call connections over a bearer network, the Media Gateway Controller comprising:

an input for receiving a signalling message;

first processing means for determining the priority of the message; and second processing means for converting the signalling message into a Gateway Control Protocol (GCP) message and for including in the GCP message a parameter indicating the priority of the associated signalling message or connection; and transfer means for transferring the GCP message to the Media Gateway.

5. A Media Gateway arranged in use to establish call connections over a bearer network, the Media Gateway comprising;

an input for receiving a Gateway Control Protocol (GCP) message from a Media Gateway Controller;

first processing means for identifying the priority level of the message from a priority parameter contained in the GCP message; and second processing means for acting on the GCP message in accordance with the priority level.

6. A Media Gateway Controller according to claim 4, wherein the signaling message received at the Media Gateway Controller is a Call Control Set-up message associated with the setting-up of a call connection, and the priority of the message determines whether a connection should be set up by the Media Controller across a bearer network ahead of a connection associated with a Call Control Set-up message previously received by the Media Gateway Controller.

7. A Media Gateway according to claim 5, wherein the signaling message received at the Media Gateway Controller is a Call Control Set-up message associated with the setting-up of a call connection, and the priority of the message determines whether a connection should be set up by the Media Controller across a bearer network ahead of a connection associated with a Call Control Set-up message previously received by the Media Gateway Controller.

8. A Media Gateway Controller arranged in use to control a Media Gateway which is responsible for establishing call connections over a bearer network, the Media Gateway Controller including electronic circuitry configured to:

receive a signaling message;

determine the priority of the message; and convert the signaling message into a Gateway Control Protocol (GCP) message and include in the GCP message a parameter indicating the priority of the associated signaling message or connection; and transfer the GCP message to the Media Gateway.

9. A Media Gateway Controller according to claim 8, wherein the signaling message received at the Media Gateway Controller is a Call Control Set-up message associated with the setting-up of a call connection, and the priority of the message determines whether a connection should be set up by the Media Controller across a bearer network ahead of a connection associated with a Call Control Set-up message previously received by the Media Gateway Controller.

10. A Media Gateway arranged in use to establish call connections over a bearer network, the Media Gateway comprising;
  an input for receiving a Gateway Control Protocol (GCP) message from a Media Gateway Controller;
  a first processor for identifying the priority level of the message from a priority parameter contained in the GCP message; and
  a second processing for acting on the GCP message in accordance with the priority level.

11. A Media Gateway according to claim 10, wherein the signaling message received at the Media Gateway Controller is a Call Control Set-up message associated with the setting-up of a call connection, and the priority of the message determines whether a connection should be set up by the Media Controller across a bearer network ahead of a connection associated with a Call Control Set-up message previously received by the Media Gateway Controller.

* * * * *